United States Patent Office 3,799,839
Patented Mar. 26, 1974

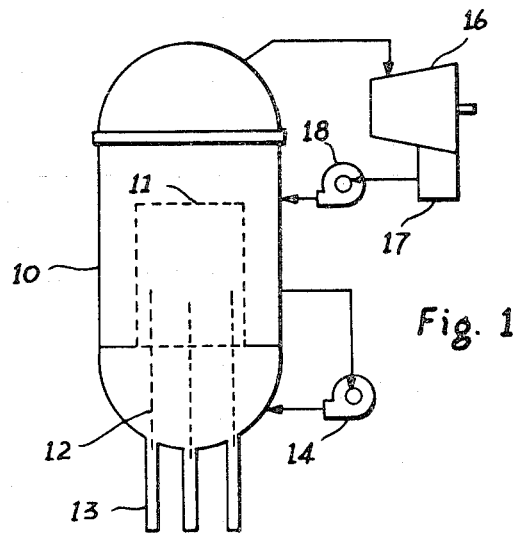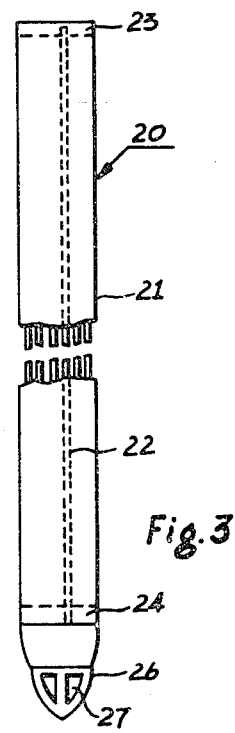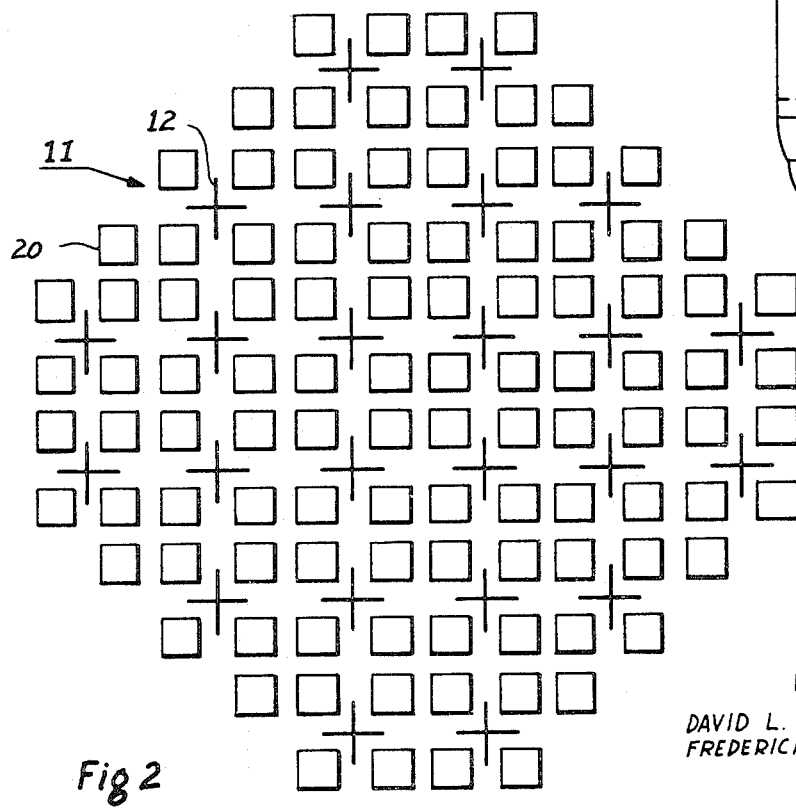

3,799,839
REACTIVITY AND POWER DISTRIBUTION
CONTROL OF NUCLEAR REACTOR
David L. Fischer and Frederick R. Channon, San Jose, Calif., assignors to General Electric Company
Continuation-in-part of application Ser. No. 762,776, Sept. 26, 1968, which is a continuation-in-part of application Ser. No. 708,391, Feb. 26, 1968, both now abandoned. This application Jan. 7, 1971, Ser. No. 104,705
Int. Cl. G21c 3/58
U.S. Cl. 176—68  8 Claims

ABSTRACT OF THE DISCLOSURE

This describes a spatial distribution, amount, density and configuration of burnable poison to control a predetermined amount of excess reactivity and to maintain a constant or stationary power distribution during the operating cycle of a nuclear reactor core. In the illustrated embodiment of the invention the burnable poison is distributed throughout the core in a relatively small number of the fuel rods. In a preferred embodiment of the invention plutonium fuel is used in conjunction with the burnable poison to improve local power distribution and control margin and as an effective means for utilizing plutonium fuel.

BACKGROUND

This application is a continuation-in-part of U.S. patent application Ser. No. 762,776, filed Sept. 26, 1968, now abandoned which is a continuation-in-part of U.S. patent application Ser. No. 708,391 filed Feb. 26, 1968, now abandoned.

The release of large amounts of energy through nuclear fission reactions is now well known. Briefly, a fissile (fissionable) atom, such as U-235, absorbs a neutron in its nucleus and undergoes a nuclear disintegration which produces on the average two fission products of lower atomic weight with great kinetic energy and several neutrons also of high energy. The kinetic energy of the fission products is quickly dissipated as heat in the nuclear fuel. This heat may be removed by passing a coolant in heat exchange relation to the fuel and the heat may then be extracted from the coolant to perform useful work.

If a nuclear reactor is to operate at a steady state power level, the fission inducing neutron population must remain constant. That is, each fission must produce a net of one neutron which induces a subsequent fission so that the fission reaction is self-sustaining. Thus for steady state operation of the nuclear system the neutron reproduction ratio or effective multiplication factor $k_{\text{eff}}$ (defined as the ratio of the neutron population at a given time to the neutron population one finite neutron lifetime earlier) must be at unity, whereat the system is said to be "just critical."

(The effective multiplication factor $k_{\text{eff}}$ is the neutron reproduction factor of the nuclear reactor considered as a whole and is to be distinguished from the local or infinite multiplication factor $k_\infty$ which defines the neutron reproduction of an infinitely large system that has throughout the same composition and characteristics as the local region of the reactor core in question.)

The power capability or power rating of a reactor is a function of the size of the core and of the heat removal capability of the coolant system. In a practical system the heat generation rate per unit volume or power density is often limited by the heat capability of materials.

As the neutron-fission chain reaction proceeds, the nuclear fuel is depleted, that is, the number of atoms of fissionable material decreases. In addition, some of the fission products produced are neutron absorbers or "poisons." Thus if the reactor is to have a reasonable lifetime of power generation the fuel core must include an initial excess of nuclear fuel which results in an initial excess of reactivity. The excess reactivity may be defined as the amount by which the uncontrolled multiplication factor exceeds unity.

This excess reactivity, provided by the excess of nuclear fuel, requires a control system of sufficient control strength to maintain the effective multiplication factor at unity during reactor operation and to reduce the effective multiplication factor to below unity in the event that it is necessary to shut down the reactor. Customarily, the control system includes neutron absorbing or poison materials that serve to control the neutron population, and hence the reactivity of the fuel core, by the non-fission absorption or capture of neutrons. The control materials may take several forms. Typically, the control system includes mechanical control in the form of a plurality of selectively actuatable control rods or the like which can be inserted into and withdrawn from the core as required to adjust the power level and distribution and to shut down the core. In addition, various types and forms of burnable poisons have been suggested for use in nuclear reactors to control the excess reactivity. A burnable poison is a neutron absorber which is converted by neutron absorption such that its control worth (neutron absorbing capability) decreases with exposure to a neutron flux.

The use of burnable poisons can minimize the amount of mechanical control required and it has long been recognized that burnable poisons offer the promise of an automatic control of excess reactivity if the decrease in excess reactivity with power operation or exposure of the nuclear core can be matched by the decrease in control worth of the burnable poison. Also, appropriate arrangements of burnable poisons provide the possibility of improved core performance by improvements in power distribution.

The use of burnable poisons has been discussed in the art, for example, by A. Radkowsky "Theory and Application of Burnable Poisons," Proceedings of the Second United Nations International Conference on the Peaceful Uses of Atomic Energy, vol. 13, pp. 426–445, United Nations, Geneva, 1958.

Various forms of burnable poisons to achieve various specific purposes have been described. For example, in U.S. Pat. No. 3,122,484, H. P. Iskenderian describes a fuel element coated with a burnable poison which shields the fuel of the element from low energy or thermal neutrons during the exposure time that the burnable poison layer is being consumed.

In U.S. Pat. No. 3,334,019, M. Bogaardt et al. describe burnable poison plates wherein a non-fissile carrier contains discrete particles or grains of burnable poison whereby the rate of conversion of the burnable poison is reduced.

In U.S. Pat. No. 3,175,955, R. D. Cheverton describes a non-uniform distribution of nuclear fuel and burnable poison to reduce the maximum peak-to-average power density.

In U.S. Pat. No. 3,257,285, C. E. Clifford et al. suggest the use of homogeneously distributed and lumped burnable poison to control excess reactivity and to provide a prompt negative temperature coefficient of reactivity.

In U.S. Pat. No. 2,984,613, C. H. Bassett discloses a fuel rod containing a burnable poison for reactivity control wherein the amount of burnable poison is greater at the medial portion of the rod than at the end portions of the rod to provide more uniform fuel burnup.

In a known type of nuclear reactor (for example, see GER-1301, A Design Description of the Dresden Nuclear Power Station, Nov. 26, 1956), the reactor core is of the heterogeneous type. That is, the nuclear fuel is in the form of elongated cladded rods, these fuel rods or elements being grouped together at fixed distances from one another in a coolant flow channel as a fuel assembly or bundle. A sufficient number of fuel assemblies are arranged in a matrix to form the nuclear reactor core capable of self-sustained fission reaction at the design power level.

In general, power reactor operation is based on the concept of an operating cycle. That is, the reactor operation is periodically interrupted for refueling to restore the necessary reactivity. During periods of operation, the fuel composition continually changes and although the overall or effective reactivity is maintained constant, the changes in local reactivity generally vary appreciably throughout the operating cycle since the loss in reactivity due to fuel burnup must be balanced over the entire core. These variations in local reactivity lead to changes in the power distribution throughout the core since the neutron flux in a region depends on the local reactivity of the region and the power density of the region is proportional to the product of the neutron flux and the fissible fuel concentration.

The power level if operation of a reactor is generally limited by the temperature limits of the materials of the core in the region of the highest power density. When the power distribution is not uniform throughout the core, only the region of highest permissible power density is operating at maximum rate with the result that the average power output is less than is theoretically possible. The practical result of a non-uniform power distribution is the requirement of a larger more expensive core and containment and greater fuel inventory for a given reactor power level. Thus to minimize fuel and plant costs it is desirable to minimize the power peaking factor (peak-to-average power density) throughout the operating cycle.

For a given set of end-of-cycle conditions, it has been found that the power peaking factor is minimized when the power distribution is stationary throughout the operating cycle. This strategy of reactor operation has been suggested by R. K. Haling in a paper entitled "Operating Strategy for Maintaining an Optimum Power Distribution Throughout Life" given at the American Nuclear Society Topical Meeting, Nuclear Performance of Power-Reactor Cores, San Francisco, Calif., Sept. 26, 1963 (TID-7672).

SUMMARY

It is the object of the present invention to provide an arrangement of burnable poison in a nuclear reactor core which will provide a substantially stationary power distribution in the core throughout the period of the operating cycle.

It is another object of the invention to provide an arrangement of burnable poison in a nuclear reactor core which will substantially match the exposure-dependent control requirements of the core throughout the period of the operating cycle.

It is another object of the invention to provide an arrangement of burnable poison in a nuclear reactor core whereby the burnable poison is substantially depleted at the end of the period of the operating cycle.

Another object of the invention is to provide a burnable poison system in a reactor which minimizes the power peaking factor throughout the operating cycle.

In commonly used nuclear power reactor fuel, fertile materials such as U-238 are included in addition to fissile atoms. For example, a commonly used fuel consists of uranium dioxide ($UO_2$) in which about 2 percent of the uranium atoms are fissile U-235 while the remaining 98 percent are the fertile isotope U-238. In the course of operating the reactor the fissile atoms (U-235) are gradually consumed and a portion of the fertile atoms (U-238) are converted to a fissile isotope (Pu-239). Since the Pu-239 atoms are fissionable by thermal neutrons, they contribute to the maintenance of the chain fission reaction. The concentration of Pu-239 thus increases and approaches an equilibrium value. Thus the spent of irradiated fuel removed from the reactor contains, in addition to a valuable quantity of the original fissile material, a significant quantity of plutonium including fissile Pu-239 and Pu-241 and fertile Pu-240. Such fuel can be reprocessed to separate and recover the uranium and plutonium for reuse. When the cost of the recovered plutonium becomes competitive with the cost of uranium it is desirable to utilize the plutonuim as a reactor fuel.

The use of plutonium fuel in a reactor core designed to use uranium fuel requires consideration of differences in reactor performance because of the differences in the nuclear characteristics of the two fuels. For example, the thermal neutron capture and fission cross sections of the fissile plutonium isotopes, Pu-239 and Pu-241, are greater than those of the fissile uranium isotope U-235.

It is therefore another object of the invention to utilize plutonium fuel in fueling or refueling a nuclear reactor.

In the use of highly self-shielding burnable poisons, the density of the poison required for substantial self-shielding is such that the initial local power density in the fuel rod containing the poison is depressed because the poison shields the fuel and also competes with the fuel for neutrons. As the poison depletes with exposure, the local power in the poisoned fuel increases. In other words, the burnable poison tends to perturb the local power distribution. It has been found that these perturbations can be significantly reduced by mixing the poison with a fuel such as plutonium which has a greater thermal neutron fission cross section than uranium fuel.

It is therefore a further object of the invention to utilize plutonium fuel in conjunction with burnable poison in a nuclear reactor.

These and other objects are achieved in accordance with the invention by determining consistent power and concomitant reactivity distributions for the operating cycles; by determining the resulting excess local reactivity; and by providing burnable poison in amount, density and configuration, spatially distributed to substantially match the changes in excess local reactivity throughout the period of the operating cycle.

In the illustrated embodiment of the invention the reactor core is zoned to provide a step-function approximation to the ideal poison distribution. The minimum density of the burnable poison is such as to provide substantial self-shielding. The burnable poison is formed in a geometrical configuration such that, as the burnable poison is depleted with exposure, the effective surface area of the poison, and hence the reactivity controlled by the poison, decreases in a manner to match the decrease in reactivity of the nuclear fuel with exposure. The initial amount of surface area of the burnable poison in each zone is selected to compensate for the initial excess reactivity to be controlled in the zone. The initial number of atoms of the burnable poison in each zone is selected to provide substantially complete burnup of the poison at the exposure to be experienced in the zone during the operating cycle. In the preferred embodiment of the invention plutonium fuel is used in conjunction with the burnable poison to improve the local power distribution and the control margin and as an effective means for utilizing plutonium fuel.

DRAWING

The invention is described more specifically hereinafter with reference to the accompanying drawing wherein:

FIG. 1 is a schematic diagram of a nuclear reactor power plant;

FIG. 2 is a schematic plan view of the nuclear fuel core;

FIG. 3 is an elevation view of a fuel assembly;

DESCRIPTION

Figure 4B:
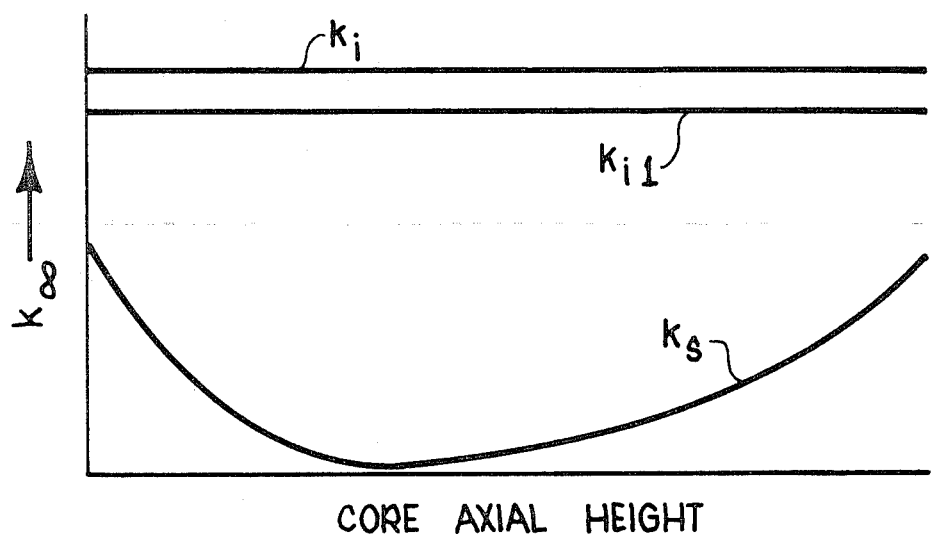
FIG. 4B illustrates a reactivity distribution consistent with the power distribution of FIG. 4A.

While not limited thereto the arrangement of burnable poisons of the invention may be utilized in a boiling water reactor, an example of which is illustrated schematically in FIG. 1. Such a reactor system includes a pressure vessel 10 containing a nuclear chain reactor core 11 submersed in a coolant such as light water. The core 11 includes a plurality of spaced fuel assemblies each of which comprises a plurality of elongated fuel elements or rods positioned in spaced relation within a coolant flow channel. A plurality of control rods 12 (shown in dotted lines) of cruciform shape and containing neutron absorbing material are selectively insertable into the spaces among the fuel assemblies by drive means 13 for mechanical control of the reactivity of the nuclear core. A pump 14 circulates the coolant through the core 11. The coolant removes heat from the fuel elements whereby a part of the coolant water is converted to steam. The steam thus produced is utilized by some means, such as by a turbine 16. The exhaust steam is condensed by a condenser 17 and returned as feedwater to the vessel 10 by a pump 18.

A plan view of the core 11 is illustrated in FIG. 2. The core 11 is formed of a plurality of fuel assemblies 20 grouped together in groups of four surrounding each control rod 12.

A fuel assembly 20 is illustrated in elevation view in FIG. 3. The fuel assembly 20 comprises a tubular flow channel 21 of square cross section containing an array of fuel elements or rods 22 supported between upper and lower tie plates 23 and 24. A nose 26 is provided with openings 27 through which the coolant water is received to flow upward past the fuel elements. (A fuel assembly is shown in greater detail by D. A. Venier et al. in U.S. Pat. No. 3,350,275.) The fuel elements 22 may be formed of a tube containing a plurality of cylindrical pellets of fuel as shown, for example, by J. L. Lass et al. in copending U.S. patent application Ser. No. 586,824, now Pat. No. 3,365,371. Typically, the fuel elements are one-half inch in diameter, or less, and in the order of twelve feet long.

The total power capability of a nuclear reactor is usually limited by the heat removal capability in the region of the fuel core with the highest power density. It is necessary to consider the power distribution throughout the period of the operating cycle because changes in power distribution can result from fuel depletion, fission product build-up, control rod movement and other effects. There is a strong economic incentive to control the power distribution such that the power density at the thermally limiting region of the core is minimized. That is, it is desirable to minimize the peak-to-average power density (the power peaking factor) over the operating cycle to thus increase the total power capability.

As mentioned hereinbefore, it has been found that for any given set of end-of-cycle conditions, the power peaking factor is minimized when the spatial (or three-dimensional) power distribution does not change during the period of the operating cycle. The end-of-cycle conditions consist of such parameters as the exposure of the fuel, the amount of reactivity control (residual poison and/or control rod) remaining in the core and the remaining excess reactivity of the core (if any).

The optimum power distribution, from the view of minimizing the power peaking factor over the operating cycle, is thus a stationary power distribution which may be uniquely determined by specification of the end-of-cycle conditions. This stationary power distribution may be computed by an iteration between power distribution and the effect of exposure on the local reactivity $k_\infty$ based upon the specified end-of-cycle conditions. By first assuming a power distribution, the reactivity ($k_\infty$) distribution to provide this power distribution under the specified end-of-cycle conditions can be determined. The reactivity distribution can then, in turn, be used in a known diffusion theory calculation to determine the end of cycle power distribution. Repetition of the procedure eventually leads to a power distribution and a reactivity distribution which are mutually consistent and this converged solution thus provides the power distribution desired to minimize the power peaking factor throughout the operating cycle.

(Methods and procedures for reactivity and power distribution determinations can be found in reactor physics handbooks such as The Naval Reactor Physics Handbook, volume I, A. Radkowsky editor, Atomic Energy Commission, 1964.)

Figure 4A:
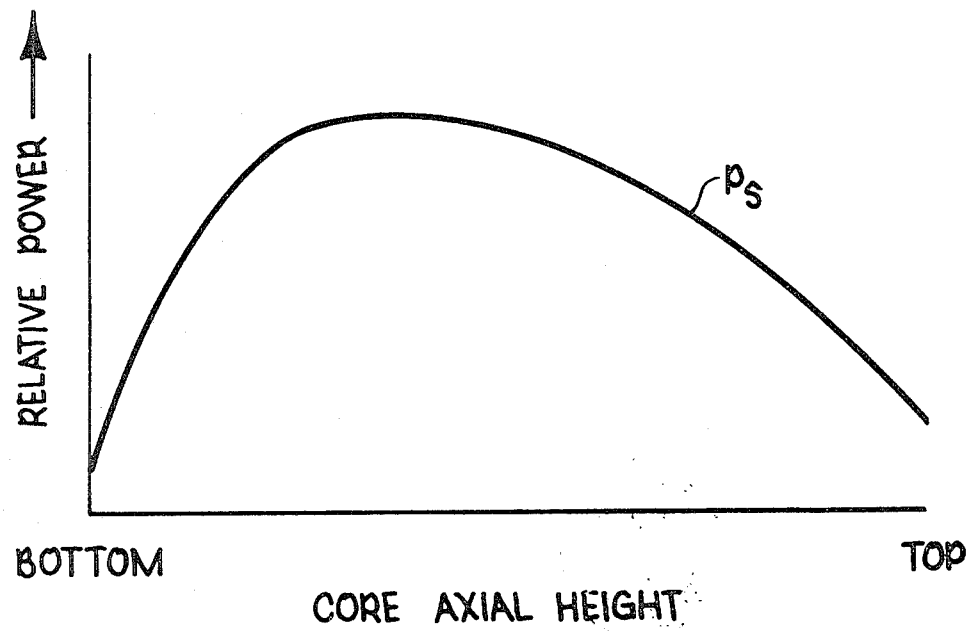
FIG. 4A illustrates a typical stationary axial power distribution.
Figure 5A:
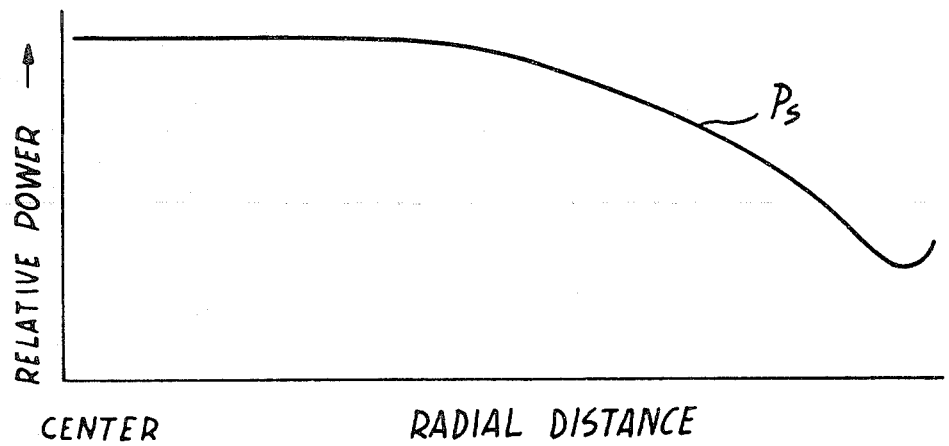
FIG. 5A illustrates a typical stationary radial power distribution.
Figure 5B:
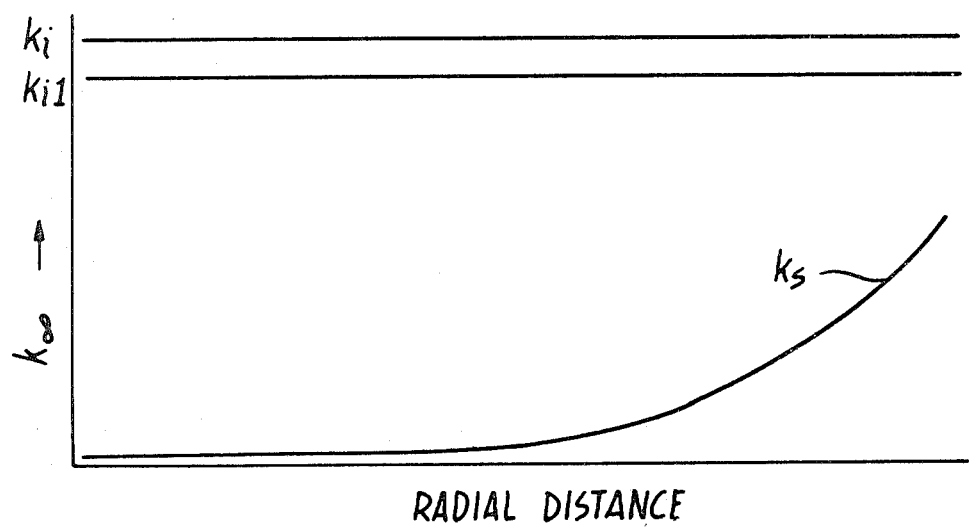
FIG. 5B illustrates a reactivity distribution consistent with the power distribution of FIG. 5A.

Examples of consistent local reactivity and power distributions are shown in FIGS. 4A–5B wherein $P_s$ is the stationary power distribution desired and $k_s$ is the local reactivity distribution required to provide $P_s$. FIGS. 4A and 4B illustrate a typical axial distribution, for example longitudinally along a fuel rod while FIGS. 5A and 5B illustrate a typical radial distribution along a transverse plane of the core. Also shown in FIGS. 4B and 5B is the initial local reactivity $k_i$ at the beginning of the fuel cycle. Thus at the beginning of the fuel cycle the excess reactivity which must be controlled is $k_i - k_s$. The local reactivity will, of course, decrease with exposure as the fuel is consumed. Thus to maintain a stationary reactivity distribution $k_s$ (and hence a stationary power distribution $P_s$) the amount of reactivity control or local control strength must be sufficient to offset the excess local reactivity and the control strength must decrease at the same rate as the decrease in local reactivity.

If the spatial distribution of the desired stationary power distribution $P_s$ is given by $P_o(x, y, z)$, the exposure E at any point $(x, y, z)$ in the core is given by:

(1) $\quad E(x, y, z, t) = E_o(x, y, z) + P_o(x, y, z)t$ where $E_o$ is the exposure distribution at the start of the cycle,
$P_o$ is the power density, and
$t$ is the time from the start of the fuel cycle in full power days.

(If the exposure E is in units of megawatt days per ton, then $P_o$ is the power density in units of megawatts per ton and $t$ is the number of days at power density $P_o$.)

If the local reactivity loss rate per unit power density is given by $\Delta k/\Delta E(x, y, z, t)$, the local reactivity loss with exposure during the fuel cycle is given by:

(2)
$$\Delta k_1(x, y, z, t) = \int_0^t P_o(x, y, z) \Delta k/\Delta E(x, y, z, t) dt$$

Assuming that at the end of the fuel cycle the reactor is just critical and no control remains in the core, then the local reactivity that must be controlled at any given time in the fuel cycle is equal to the difference between the reactivity loss at the end of the cycle and the reactivity loss at the given time in the cycle. Thus:

(3) $\quad \Delta k_c(x, y, z, t) = \Delta k_1(x, y, z, t_f) - \Delta k_1(x, y, z, t)$ where $\Delta k_c$ is the total local reactivity control at the given time including control rods and other poisons,
$\Delta k_1$ is the loss in local reactivity,
$t$ is the given exposure time, and
$t_f$ is the exposure time at the end of the fuel cycle.

The relationship (3) thus defines the exposure time relationship of the local reactivity control that is necessary to maintain the desired stationary power distribution.

Figure 6:
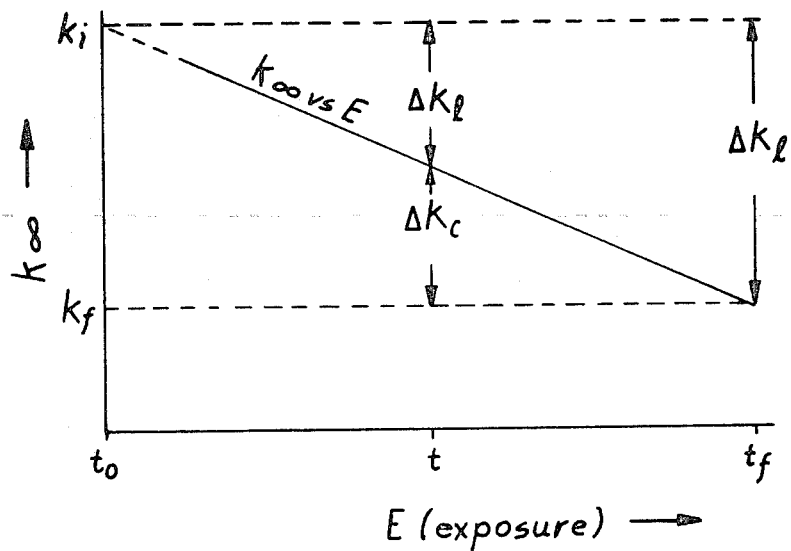
FIG. 6 illustrates change in reactivity with exposure.

The relationship (3) is illustrated graphically in FIG. 6 wherein $k_i$ is the initial local reactivity at exposure time $t_o$ and $k_f$ is the final local reactivity at exposure time $t_f$ at the end of the fuel cycle. The reactivity loss $\Delta k_1$ at exposure time $t_f$ (end-of-cycle) is equal to $k_i - k_f$. The required reactivity control $\Delta k_c$ at any time $t$ is clearly equal to the difference between $\Delta k_1$ at time $t_f$ and $\Delta k_1$ at time $t$. (While a linear curve of $k_\infty$ versus E is shown in FIG. 6, the relationship (3) holds for any shape of reactivity loss curve.)

To provide the desired stationary power distribution over the core operating cycle in accordance with the invention, it is thus necessary to provide a reactivity control strength and distribution and an exposure time dependent rate of change of control strength which matches the changes in local reactivity as the fuel is consumed.

In accordance with the invention this necessary control is provided by a distribution of burnable poison which will (a) provide the desired power distribution at the beginning of the fuel cycle, (a) maintain this power distribution substantially constant or stationary throughout the fuel cycle, and (c) result in a negligible residue of poison at the end of the fuel cycle.

These results are achieved in accordance with the invention by providing a spatial distribution of poison material (a) which provides an initial reactivity control comparable to the reactivity loss to be experienced by the fuel during the cycle, and (b) wherein the poison material has a concentration and configuration such that it depletes with exposure at a rate comparable to the rate of loss of reactivity of the fuel during the fuel cycle and is completely consumed at the exposure accumulated during the cycle.

In the large power reactors, it is found that (except for an initial relatively short period during which equilibrium with fertile fuel conversion and poison product buildup is taking place) the loss in local reactivity $k_\infty$ is substantially linear with exposure over a broad range of exposure as shown in FIG. 6. That is, the rate of decrease of $k_\infty$ is substantially constant.

If this local reactivity loss rate is designated a constant L, where $\Delta k/\Delta E(x, y, z, t) = L$, then from (2) above:

(4) $\quad \Delta k_1(x, y, z, t) = P_o L t$ and from (3) above:

(5) $\quad \Delta k_c(x, y, z, t) = P_o L (t_f - t)$

The relationship (5) thus defines the exposure time relationship of the local reactivity control that is required to maintain the desired stationary power distribution when the local reactivity decrease with exposure is linear, that is, when the local reactivity loss rate is a constant (as illustrated in FIG. 6). Under this constant reactivity loss rate condition, (a) the decrease in control strength must be linear, that is, the rate of change of control strength with exposure must be a constant to match the constant reactivity loss rate; and (b) the strength of the required local reactivity control is proportional to the local power density.

It has been found that a substantially constant rate of decrease of control strength is provided by a self-shielding burnable poison in the form of a cylinder. By "self-shielding" is meant that the neutron absorption cross section $\sigma_a$ and the density of the poison atoms are sufficiently large that incident neutrons are captured in the outer few layers of the cylinder whereby these outer layers shield the inner layers from the neutrons. As the poison atoms in the outer layers capture neutrons, they are transformed into isotopes of low cross section. Thus with exposure, the outer layer becomes transparent to neutrons and the next inner layer is exposed and so forth. Thus the effective behavior of the poison cylinder is that of a control rod which is shrinking in radius as a function of exposure and which is thereby controlling less and less reactivity since the control strength is proportional to the surface area of the poison cylinder. This is more clearly evident from the following:

If the cylinder of poison material is relatively long compared to its diameter and is small enough in diameter so that it does not perturb the neutron flux $\phi$ external to the cylinder, the neutron current J at the surface of the poison is given by:

(6) $\quad\quad J = \phi/4$ neutrons/cm.$^2$-sec.

If $\rho$ (atoms/cm.$^3$) is the density of the high cross section poison atoms, then the atoms per unit length $h$ of the cylinder is given by:

(7) $\quad\quad h = \rho \pi r^2$ where $r$ is the radius of the unburned poison.

If the burnable poison is assumed to be completely black to neutrons (infinite $\sigma_a$) and is thus self-shielding, as described above, burnup of the poison occurs at the surface thereof and the number of poison atoms burned in time $t$ is substantially equal to the number of neutrons incident on the surface of poison during this time. Thus:

(8) $$\frac{dh}{dt} = -2\pi r \rho \frac{dr}{dt} = 2\pi r J$$

Combining (6) and (8) gives:

$$dr = -\frac{\phi}{4\rho} dt$$

which when integrated from an initial radius $r_o$ to radius $r$ over time $t$ gives:

(9) $$r = r_o - \frac{\bar\phi t}{4\rho}$$

where $\bar\phi$ is the average neutron flux during the time $t$.

The relationship (9) shows that the radius of the poison cylinder is reduced linearly in direct proportion to the flux-time product $\bar\phi t$, and in inverse proportion to the poison density $\rho$.

The poison is completely consumed when the radius of the poison cylinder is reduced to zero. Also, the flux-time product $\phi t$ is directly proportional to the exposure E and is equal to $C_1 E$ where $C_1$ is a function of the fuel lattice properties such as the initial enrichment of the fuel and its fission cross section. Thus from (9):

(10) $$\bar{\phi}t_b = 4\rho r_0 = C_1 E_b$$

where $t_b$ is the time for complete burnup of the poison, and $E_b$ is the exposure increment (in megawatt days per ton for example) for complete poison burnup.

Thus it is seen that the poison is consumed in an exposure interval $E_b$ which is proportional to the product of the initial poison cylinder radius $r_0$ and the poison atom density $\rho$.

Now to be considered is the magnitude of the control provided by the cylinder of burnable poison and the time dependence of this control. The reactivity controlled by the burnable poison $k_p$ is substantially proportional to the neutron absorption of the poison. Thus:

$$k_p = \frac{\Sigma_a^p}{\Sigma_a^t} = \frac{\phi \Sigma_a^p}{\phi \Sigma_a^t}$$

where $$\Sigma_a^p$$

is the thermal neutron absorption cross section of the poison averaged over the fuel assembly, and $\Sigma_a^t$ is the total thermal neutron absorption cross section of the fuel assembly.

It is again assumed that the poison is completely black to neutrons so that all incident neutrons are absorbed; thus from (8) $\phi \Sigma_a^p$ equals $2\pi r J$ times the number of poison cylinders and if $T$ is defined as the number of poison cylinders per unit cross section area of the core, then:

(11) $$k_p \simeq \frac{(2\pi r)JT}{\phi \Sigma_a^t} = \frac{\pi r T}{2\Sigma_a^t}$$

where ($2\pi r$) is the circumference of the poison cylinder,
$J$ is the neutron current density which from (6) above is equal to $\phi/4$,
$\phi$ is the neutron flux, and
$\Sigma_a^t$ is total neutron absorption cross section.

In most large power reactors the total absorption cross section is reasonably constant with exposure depending upon the fuel enrichment and the fertile-to-fissile fuel conversion ratio. If the total absorption cross section is taken as constant, then $\pi/2\Sigma_a^t$ can be represented as a constant $1/C_2$ or:

(12) $$k_p = \frac{1}{C_2} rT$$

The foregoing is based on the assumption that the poison cylinders are separated from one another by a few thermal neutron mean free path lengths so that they do not compete for neutrons. With this and the other assumptions set forth above (that the poison is completely black to neutrons and that the total absorption cross section is constant) it is seen from (12) that the amount of reactivity controlled by the poison is directly proportional to the product of the radius of the poison cylinder and the number of poison cylinders per unit cross section area of the core.

From relationships (9) and (10) above it was shown that the radius $r$ of the poison cylinders decreases linearly with exposure. Thus from (12) it can be concluded that the reactivity controlled by the poison also decreases linearly with exposure.

Rewriting (10) in the form $\rho r_0 = C_1/4 E_b$ and defining $C_1/4$ as a constant $C_3$ then:

(13) $$\rho r_0 = C_3 E_b$$

Rewriting (12) in terms of the initial poison cylinder radium $r_0$, then:

(14) $$Tr_0 = C_2 k_{pi}$$

where $k_{pi}$ is the initial reactivity controlled by the burnable poison.

Figure 7:
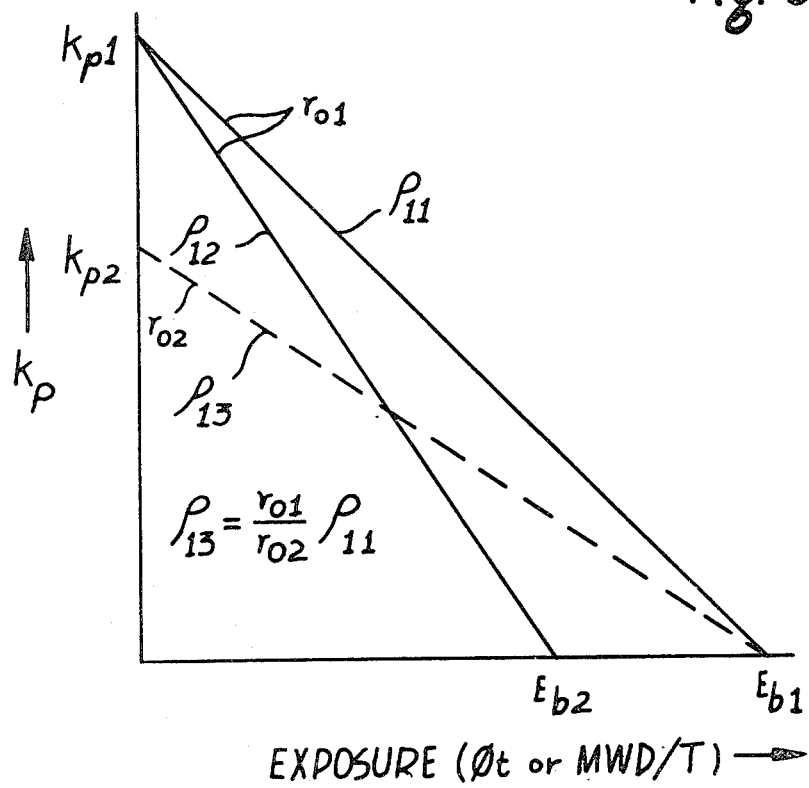
FIG. 7 illustrates the changes in reactivity control versus exposure for changes in the density and initial radius of self-shielding cylinders of burnable poison.

The relationship among the initial poison cylinder radius $r_0$, the poison density $\rho$ and the change in control strength with exposure is illustrated graphically in FIG. 7. A highly self-shielding burnable poison in a cylinder of radius $r_{01}$ and with a density of $\rho_{11}$ provides an initial control strength $k_{p1}$ and it depletes linearly with exposure over an exposure interval $E_{b1}$. A poison rod of the same radius but with a lesser poison density $\rho_{12}$ provides the same initial control strength $k_{p1}$ but it depletes in a shorter exposure interval $E_{b2}$. A poison rod of smaller diameter $r_{02}$ with a density $\rho_{13}$ provides a lesser initial control strength $k_{p2}$ and it depletes in the same exposure interval $E_{b1}$ if the density $\rho_{13}$ is equal to the ratio of the radii $r_{01}/r_{02}$ times density $\rho_{11}$.

Thus from the foregoing it is seen that, for a highly self-shielding poison in cylindrical form, the density of the poison determines the exposure interval for burnup of the poison. The control strength of the poison is determined by the surface area (which is a function of the radius) of the poison cylinder and by the number of such poison cylinders per unit cross section area of the core. Thus the radius, density, number and distribution of such poison cylinders can be selected to provide a decrease in reactivity control strength with exposure which matches the decrease in excess reactivity of the nuclear fuel with exposure.

Where, as in accordance with the invention, the burnable poison is spatially distributed such as to provide a stationary power distribution throughout the exposure interval or operating cycle then the initial magnitude of the poison control strength $k_{pi}$, and the exposure lifetime $E_b$ are both proportional to the local power density P. Furthermore the local power density P is directly proportional to the local neutron flux $\phi$. Thus:

(15) $$\rho r_0 = C_4 P = C_5 \phi$$

and

(16) $$Tr_0 = C_6 P = C_7 \phi$$

where $C_4$–$C_7$ are constants of proportionality.

The foregoing relationships are developed herein to illustrate the basic principles of the invention and they are applied hereinafter to a specific example of an application of the invention. However, it is pointed out that considerably more detailed analytical methods would ordinarily be employed in the actual calculation of most designs. As pointed out hereinbefore, the foregoing relationships are based on these assumptions: (a) that the presence of the poison cylinders does not appreciably perturb the neutron flux; (b) that the poison cylinders are sufficiently separated from one another so that they do not appreciably compete for neutrons or shadow one another; (c) that the poison has a sufficiently large macroscopic cross section and density so that it is substantially black to neutrons whereby the poison is substantially self-shielding; and (d) that the total neutron absorption cross section in the core is substantially constant with exposure. In a given situation there may be departures from these ideal conditions and it may be desirable to evaluate the magnitude and direction of these departures to provide appropriate correction factors.

For example, the relationship (6) above is based on the assumption that the poison cylinders are so small that they do not significantly perturb the neutron flux. If the neutron current into a cylinder from an infinite homogeneous medium is calculated by known diffusion theory the result is:

(17) $$J = \frac{\phi}{4}\left[\frac{4\frac{D}{L}}{\frac{\Delta}{L} + \frac{K_0(r/L)}{K_1(r/L)}}\right] = \frac{\phi}{4} g$$

where

D is the thermal neutron diffusion coefficient,
L is the thermal neutron diffusion length,
$K_0$ and $K_1$ are Bessel functions,
$\Delta$ is the inverse logarithmic derivative of the flux $\phi$ at the surface of the cylinder, and
$r$ is the time dependent radius of the cylinder.

The term in brackets, designated $g$, is the term by which the neutron current J varies from the ideal value $\phi/4$ given by relationship (6) hereinbefore. The variation of the term $g$ with poison cylinder radius is graphically illustrated in FIG. 10 for representative values of L and D. It is seen that the relationship (6) overestimates the neutron current by about 50 percent for a poison cylinder radius as large as 1 centimeter. The larger poison cylinders thus tend to deplete more rapidly as the poison cylinder radius decreases with exposure.

On the other hand, the relationship (8) above is based on the assumption that the burnable poison is completely black to neutrons. A departure from this assumption means that there is some neutron penetration and consequently greater neutron absorption at the beginning of the cycle than toward the end of the cycle. This effect is thus opposite to the effect of larger cylinders discussed above and, therefore, the two effects tend to offset one another.

The neutron absorption cross section of most materials decreases in inverse proportion to the neutron velocity. Thus the degree of selfshielding is less for higher energy neutrons, however, the fraction of neutrons captured by the burnable poison at these energies is usually relatively small.

Another factor not taken into account by the foregoing relationships is the contribution of the ends of the cylinders to the surface area of the burnable poison. In the illustrated embodiment this contribution is relatively small because of the large length-to-diameter ratio of the poison cylinders.

Considering now the distribution of the burnable poison throughout the fuel core, in a practical nuclear reactor the neutron flux (and hence the power density) and the amount of reactivity control required varies both axially and radially throughout the core. Ideally the burnable poison placed in the core to control the excess reactivity would match the excess reactivity at each point in the core. For example, in FIG. 9 a curve $k_{pi}$ illustrates the initial reactivity control required of the poison along a typical axial line through the core. A continuously varying poison distribution would be required to provide the reactivity control represented by the curve $k_{pi}$. In practice the purposes of the invention (a stationary power distribution and complete poison burnup) can be substantially achieved by a step-function approximation to the ideal poison distribution. This is achieved by zoning the core and by placing poison in each zone in accordance with the average characteristics of the zone. That is, the core is considered as comprising a plurality of elemental volumes. From the average neutron flux and the average initial excess reactivity in each such elemental volume, a configuration and density of burnable poison for each such elemental volume can be determined in accordance with the principles hereinbefore set forth.

The size and locations of the zones is determined by balancing the cost of an increased number of zones against the cost consequences due to mismatch in poison control strength between adjacent zones. Practical values of zone-to-zone mismatch are as follows: For inner zones of the core the zone-to-zone mismatch is preferably not more than about 6 percent and preferably between 1 percent and 3 percent. In other words, for the inner zones, the size of each zone is selected such that the average value of the control strength of the poison required in the zone to provide the stationary power distribution differs no more than 6 percent (and preferably from between 1 percent and 3 percent) from the average value of the required initial control strength of the poison in adjacent inner zones. In the peripheral zones (the zones which border on the outside of the core) a greater mismatch can be tolerated. In these peripheral zones the mismatch is preferably limited to a maximum of 12 percent with a preferred range of 3 percent to 6 percent.

Another factor to be considered is the refueling schedule and scheme to be employed. If all of the fuel assemblies or bundles 20 (FIG. 2) are to be replaced at the end of each fuel cycle then burnable poison can be placed in each of the fuel assemblies. However, in accordance with a known refueling schedule only about one-fourth of the fuel assemblies are replaced at each refueling. In such a case the burnable poison can be placed in the new fuel assemblies which are appropriately radially distributed.

Figure 8A:
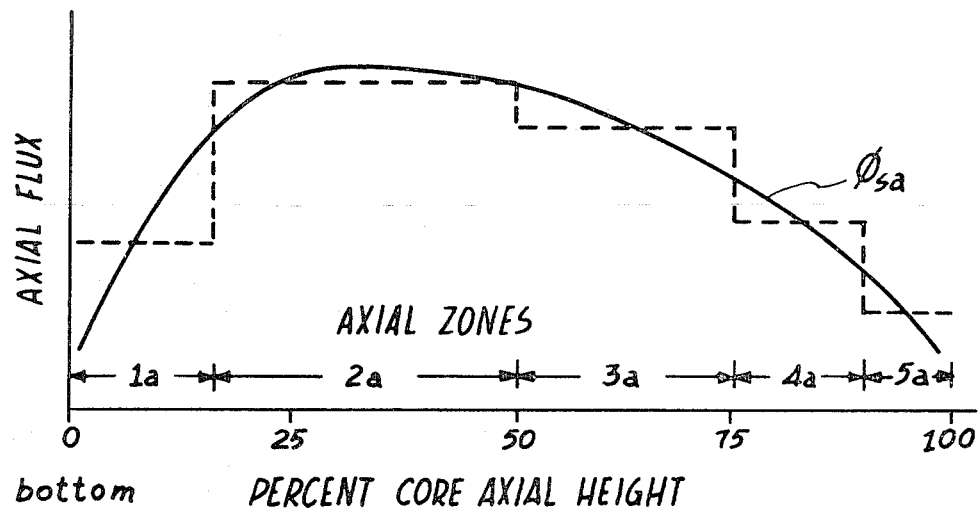
FIG. 8A illustrates a neutron flux distribution corresponding to the power distribution of FIG. 4A.
Figure 8B:
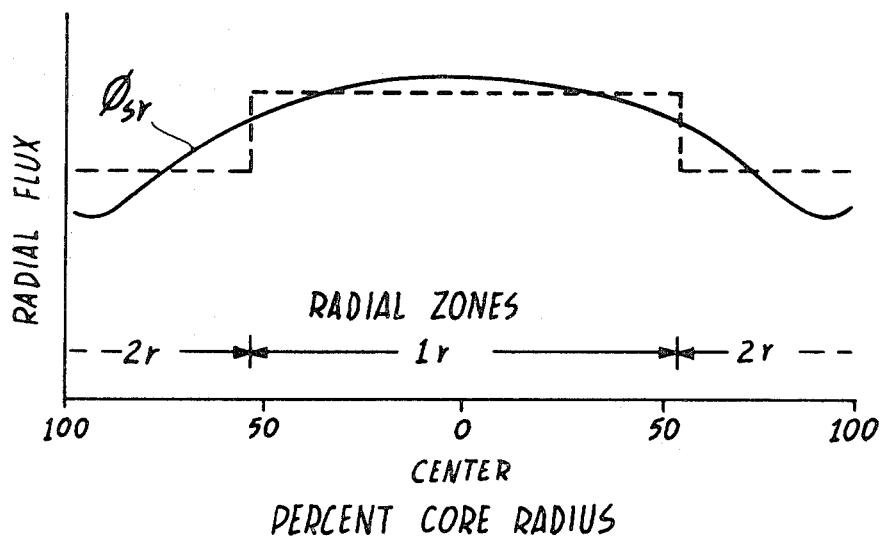
FIG. 8B illustrates a neutron flux distribution corresponding to the power distribution of FIG. 5A.
Figure 11B:
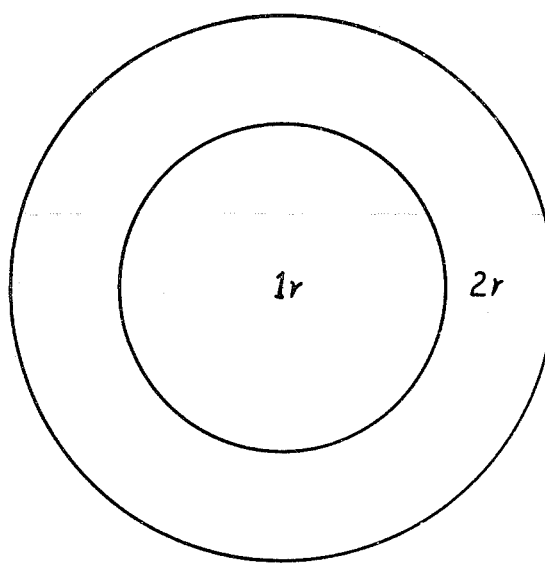
FIGS. 11A and 11B illustrate the zoning of the reactor core.
Figure 11A:
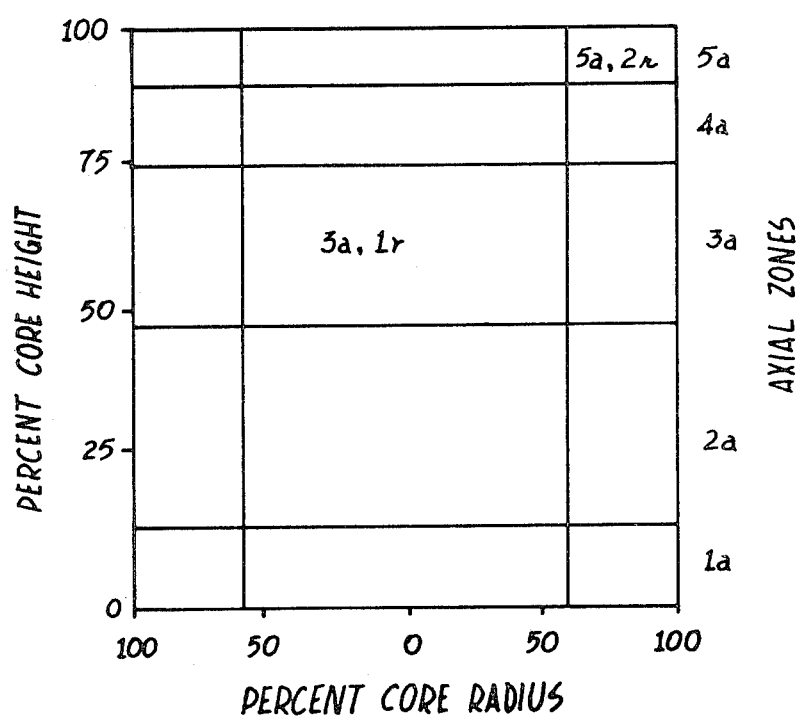

In accordance with the illustrated embodiment of the invention the burnable poison is distributed in five axial and two radial zones and, thus, in ten elemental volumes of the core as illustrated schematically in FIGS. 11A and 11B. As discussed hereinbefore, a stationary, axial power distribution $P_s$ is shown in FIG. 4A. The power distribution is directly proportional to the neutron flux distribution. Thus shown in FIG. 8A is the stationary flux distribution $\phi_{sa}$ corresponding to the stationary power distribution $P_s$ of FIG. 4A. A corresponding radial stationary flux distribution $\phi_{sr}$ is shown in FIG. 8B. In FIG. 8A a step-function approximation to the flux distribution $\phi_{sa}$ is shown in dashed lines in five axial zones $1a-5a$. Similarly, in FIG. 8B a step-function approximation to the radial flux distribution $\phi_{sr}$ is shown in dashed lines in two radial zones $1r$ and $2r$. Thus each of the ten zones of the illustrated example can be designated by its axial and radial location, for example, the uppermost outer zone $(5a, 2r)$ as illustrated in FIGS. 11A and 11B.

The average neutron flux in each of the zones can be determined analytically from the core characteristics in known manner. Assuming a given poison cylinder initial radius $r_0$ and a predetermined exposure (or burnup) time $t_b$, the poison density $\rho$ required for burnup of the poison in time $t_b$ is given by relationship (10) above which may be rewritten as

(18)
$$\rho = \frac{\bar{\phi} t_b}{4 r_0}$$

where $\bar{\phi}$ is the average full-power neutron flux in the zone.

As discussed hereinbefore a stationary reactivity distribution $k_s$ (to provide the stationary power distribution $P_s$ of FIG. 4A) is shown in FIG. 4B. The initial uncontrolled core reactivity is shown by $k_i$ while $k_{ii}$ is the initial reactivity minus the amount of reactivity which is to be controlled by the movable control rod system for maneuvering or change of reactor power level. (Usually this control rod reactivity allowance will be in the order of two percent excess reactivity.)

Figure 9:
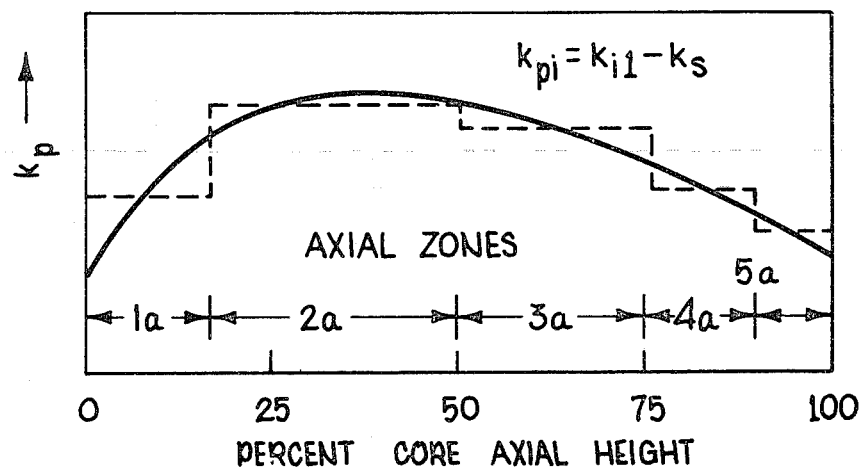
FIG. 9 illustrates a distribution of reactivity to be controlled by burnable poison as derived from FIG. 4B.

Thus the initial reactivity to be controlled by the burnable poison is the difference between $k_s$ and $k_{ii}$. This difference is shown in FIG. 9 as a reactivity control distribution curve $k_{pi}$. As in the case of the neutron flux distribution (FIG. 8A), the reactivity control distribution $k_{pi}$ can be approximated as a step-function of the average reactivity in each zone as shown by the dashed line in FIG. 9. The average reactivity and the average total neutron absorption in each zone can be determined analytically from the core characteristics in known manner. The number of poison cylinders per unit cross section area of each zone can then be determined from (11) above which may be rewritten as

(19)
$$T = \frac{2 \Sigma_a{}^t k_{pi}}{\pi r_0}$$

Iteration among the selection of a poison cylinder initial radius $r_0$, the determination of the density $\rho$ and the number of cylinders $T$ will, in general, be required to arrive at a practical arrangement. Also, the assumption that the poison is substantially self-shielding establishes a lower limit to the density of the poison for a given poison material. This is because the degree of self-shielding is proportional to the product of the density and the absorption cross section of the poison material, the latter being a property of the particular material. That is, the larger the absorption cross section of the poison material the lower the density required to provide a given degree of self-shielding. It is seen from relationship (10), above, that the establishment of a minimum poison density $\rho$ thereby establishes a maximum initial radius $r_0$ of the poison cylinders for a given poison material.

A variety of arrangements of the poison cylinders is possible depending on the particular requirements. For example, the poison material may be formed in separate rods or elements; cylinders of poison material may be placed in the opening of annularly formed fuel pellets or fuel rods; rod shaped particles of poison material may be dispersed in the fuel; the poison material may be molecularly dispersed in the fuel.

A number of materials are suitable for use as poison material including boron, samarium, dysprosium, europium, cadmium and gadolinium. Gadolinium has the desirable characteristics of a very high neutron absorption cross section, so that self-shielding is obtained at relatively low densities, and a neutron energy dependence such that its cross section decrease rapidly for neutrons above thermal energy whereby its capture of high energy neutrons is relatively low.

In an example of the application of the principles of the present invention, burnable poison was placed in 106 fuel assemblies of a total of 464 fuel assemblies in a reactor core. Each of the fuel assemblies contained 36 fuel rods. Gadolinium was selected as the poison material in the form of gadolinium oxide $Gd_2O_3$. The gadolinium oxide was intimately and uniformly mixed with the uranium oxide fuel as powder and them prepared as pellets for loading into the fuel rods. At the small densities of gadolinium oxide used (from 0.95–1.55 weight percent) $Gd_2O_3$ and $UO_2$ form a solid solution so that there is complete dispersion of $Gd_2O_3$ in $UO_2$ on the molecular level and no particles or agglomerations of $Gd_2O_3$ occur. Thus the effective initial radius $r_0$ of the posion rod is the radius of the resulting composite fuel-poison rod—in this example about one-quarter inch. With this initial radius and at the minimum density of gadolinium used, the poison is substantially self-shielding.

The variation in the density and the number of cylinders of poison materials as required among the various zones (FIGS. 11A and 11B) was achieved by appropriate variation in the number of fuel rods containing the poison material and the poison densities thereof.

To achieve the appropriate distribution of the poison two types of poison-containing fuel assemblies were used. Assemblies containing a relatively high amount of poison material, designated type H assembies, illustrated in FIGS. 12A and 12B, were used in the central zones of high neutron flux while assemblies containing a relatively lower amount of poison material, designated type L assemblies, illustrated in FIGS. 13A and 13B, were used in the outer zones of lower neutron flux.

Figure 12A:
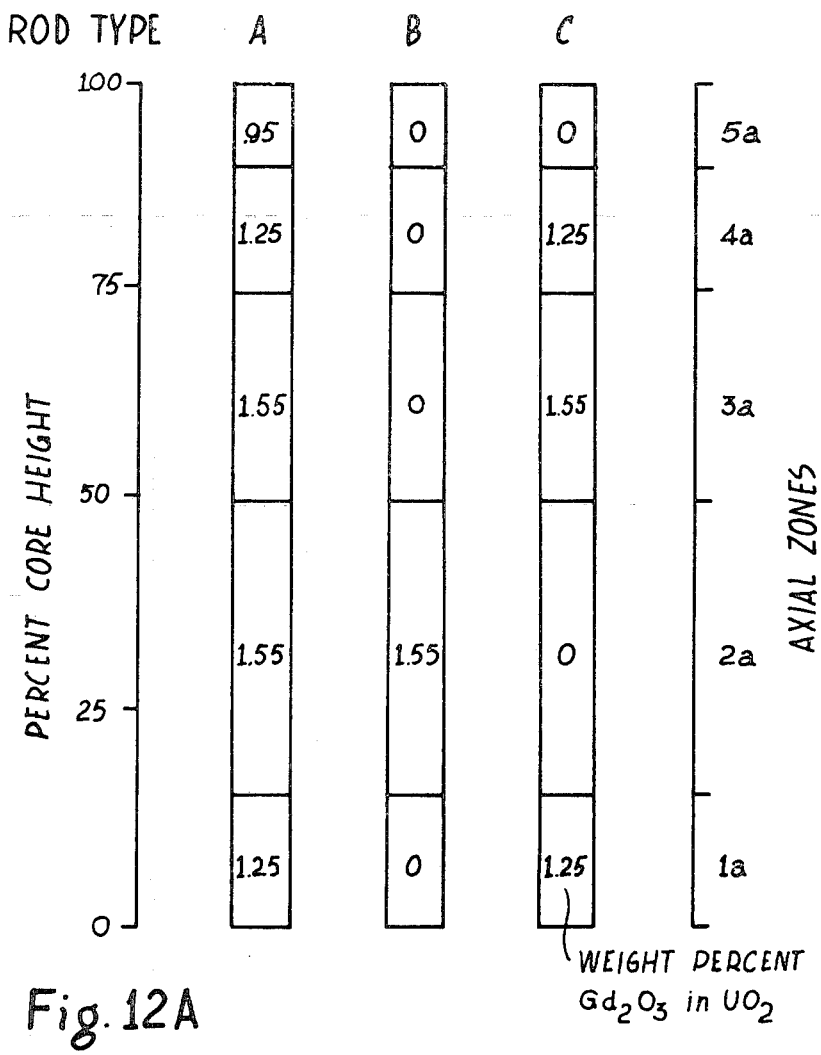
FIGS. 12A and 12B illustrate an example of the distribution of burnable poison in the rods of fuel assemblies for use in the central zones of a reactor core.
Figure 12B:
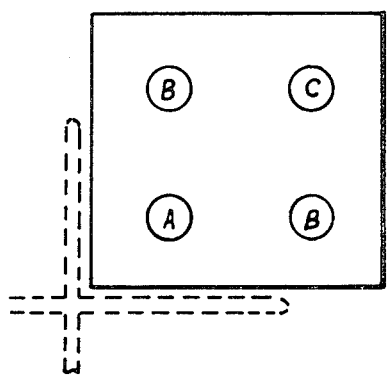

FIG. 12A illustrates the axial distribution of the gadolinium poison material in three poison-containing rod types A, B and C used in the type H assemblies while FIG. 12B is a plan view view of the type assemblies illustraing the radial location of the poison-containing rods in the assembly.

Figure 13A:
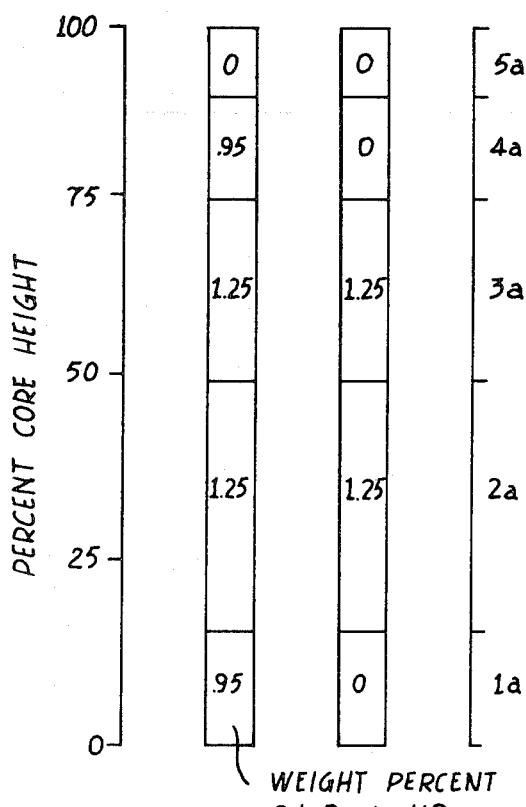
FIGS. 13A and 13B illustrate an example of the distribution of burnable poison in the rods of fuel assemblies for use in the outer zones of a reactor core.
Figure 13B:
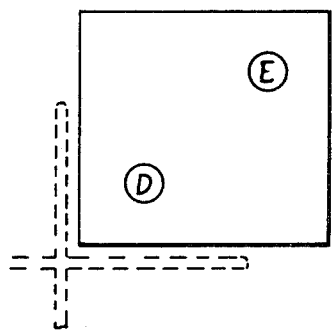

Similarly, FIG. 13A illustrates the axial distribution of the poison in two-containing rod types D and E used in the type L assemblies while FIG. 13B is a plan view view of the type L assemblies illustrating the radial location of the poison-containing rods.

Figure 14:
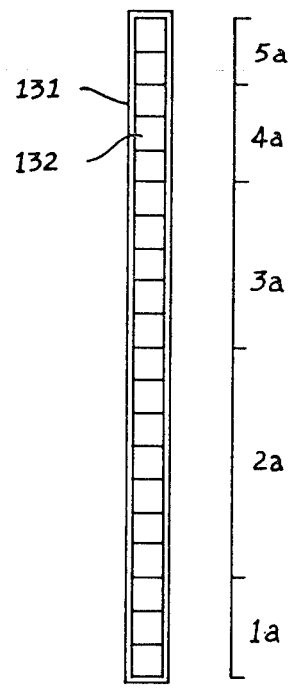
FIG. 14 illustrates a fuel rod.

It is noted that only three densities of the burnable position were required. As shown in FIG. 14, the fuel rods of FIG. 11A and 12A are formed of a tubular housing or cladding 131 containing the nuclear fuel in the form of a plurality of cylindrical fuel pellets 132. The distribution of the burnable poison as shown in FIGS. 11A and 12A is achieved by loading the appropriate numbers and densities of poison-containing fuel pellets into the housing 131 at the various axial zones. The need of only three poison densities greatly simplifies the manufacture of the poison-containing fuel pellets.

In the present example, of the 106 poison-containing fuel assemblies in the core, 56 were of type H and were substantially evenly distributed in radial zone $1r$ (FIGS. 11A and 11B) while 50 were of type L and were, similarly, substantially evenly distributed in radial zone $2r$.

By way of example, the density of the poison and the number of poison cylinders in zone ($3a$, $1r$) (FIGS. 11A and 11B) may be determined from relationships (18) and (19) above as follows: If the average (full power) neutron flux in zone ($3a$, $1r$) is $\bar\phi = 2.5 \times 10^{13}$ neutrons/cm.²-sec. and the desired cycle time is one year at 75 percent capacity, then $t_f = 0.75 \times 3 \times 10^7$ seconds. Assuming that $t_b$ then $\bar\phi t_b = 6.1 \times 10^{20}$ neutrons/cm.². If the initial radius of the poison cylinders is 0.635 cm. then the required density of the poison is, from (18) above:

$$\rho = \frac{\bar\phi t_b}{4r_0} = \frac{6.1 \times 10^{20}}{2.54} \simeq 2.4 \times 10^{20} \frac{\text{atoms}}{\text{cm.}^3}$$

This is the required concentration of high cross section gadolinium atoms which constitute 30.4 percent of naturally occurring gadolinum. Thus the required density of naturally occurring gadolinium $\rho_0$ is:

$$\rho_n = \frac{2.4 \times 10^{20}}{0.304} = 7.9 \times 10^{20} \frac{\text{atoms}}{\text{cm.}^3}$$

The corresponding density of uranium atoms in $UO_2$ is about $2.4 \times 10^{22}$. Thus the weight fraction of $Gd_2O_3$ in $UO_2$ is:

$$\text{wt. fraction} = \frac{7.9 \times 10^{20}}{2.4 \times 10^{22}} \times \frac{157 + 3/2(16)}{238 + 2(16)} \simeq 0.022$$

or 2.2 percent

For the relatively large radius (0.635 cm.) for the poison cylinders in the present example, the use of the ideal relationship of (18) over estimates the neutron current into the cylinder during the first part of cycle. Thus the weight fraction 2.2 percent is reduced by the factor $g$ from relationship (17).

Figure 10:
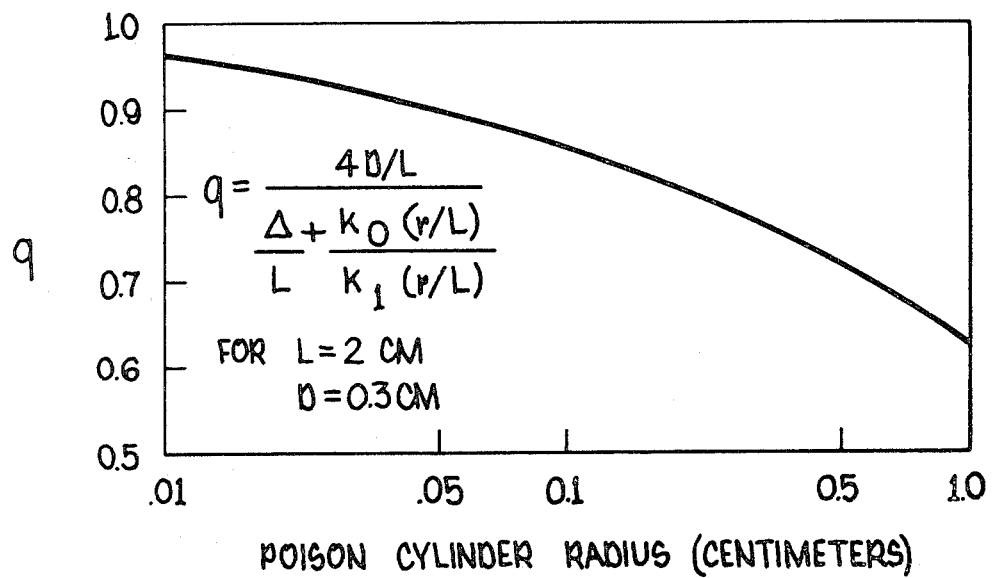
FIG. 10 illustrates a neutron current density correction factor as a function of poison cylinder radius.

From FIG. 10 the factor $g$ for the given radius is about 0.7. The weight faction 2.2 percent times 0.7 equals 1.54 percent which is in substantial agreement with the weight percent 1.55 for the zone ($3a$, $1r$) shown in FIG. 12 A.

The number T of poison cylinders per square centimeter to provide an initial control strength $k_{p1}$ (FIG. 9) in zone ($3a$, $1r$) is given by relationship (19). For this example, the exposure to be accumulated in this zone is about 4100 mwd./t. (megawatt days per ton). The loss in local reactivity is at a rate of about 0.015/1000 mwd./t. Thus the initial reactivity control strength $k_{p1}$ is 4.1 (.015) = 0.0615. The macroscopic absorption cross section $\Sigma_a^t$ is about 0.05 cm.$^{-1}$. Thus from relationship (19):

$$T = \frac{2(.05)(.0615)}{\pi(.635)} = 3.1 \times 10^{-3} \frac{\text{cylinders}}{\text{cm.}^2}$$

In the present example, the poison cylinders are in about one-fourth of the fuel assemblies and each fuel assembly is about 25 square inches in cross section. Thus the number of cylinders in each of the fuel assemblies which contain poison is:

4(25)(2.54)² (3.1×10⁻³) = 2 cylinders per assembly containing burnable poison

This is the poison cylinder density in zone (3a, 1r) of the present example as shown in FIG. 12A.

The use of highly self-shielding burnable poison in a relatively small number of the fuel rods, as described herein, may give rise to several undesirable effects in the operation of the fuel core.

First, the initial power density (unit power per unit of fuel) is substantially reduced in the fuel rod containing the burnable poison because the poison shields the fuel and competes with the fuel for the available thermal neutrons. Thus this effect can result in undesirable local power peaking (the ratio of the maximum-to-average power in the fuel rods of the fuel assembly).

Second, the reactivity controlled by the highly self-shielding burnable poison increases from the cold shutdown condition of the reactor to the hot operating condition. This effect is due primarily to the fact that the thermal neutron diffusion length increases with the decreased density of the moderator and the decreased absorption cross sections of the fuel and the materials other than the self-shielded burnable poison from the cold to hot condition. In other words, in the hot condition the thermal neutrons travel further before they are absorbed, and therefore, the likelihood of capture by the poison is increased. For a given mechanical control system this effect can create a problem in the balance between the reactivity control required to meet the cold shutdown margin and the amount of reactivity control that must be removed in the hot operating condition to achieve full power.

Third, as the burnable poison is depleted with exposure, the power density in the poisoned fuel rods tends to increase. This effect also can result in undesirable local power peaking and a risk of exceeding thermal limits, particularly near the end of the fuel cycle when depletion of the burnable poison is approached.

Figure 15:
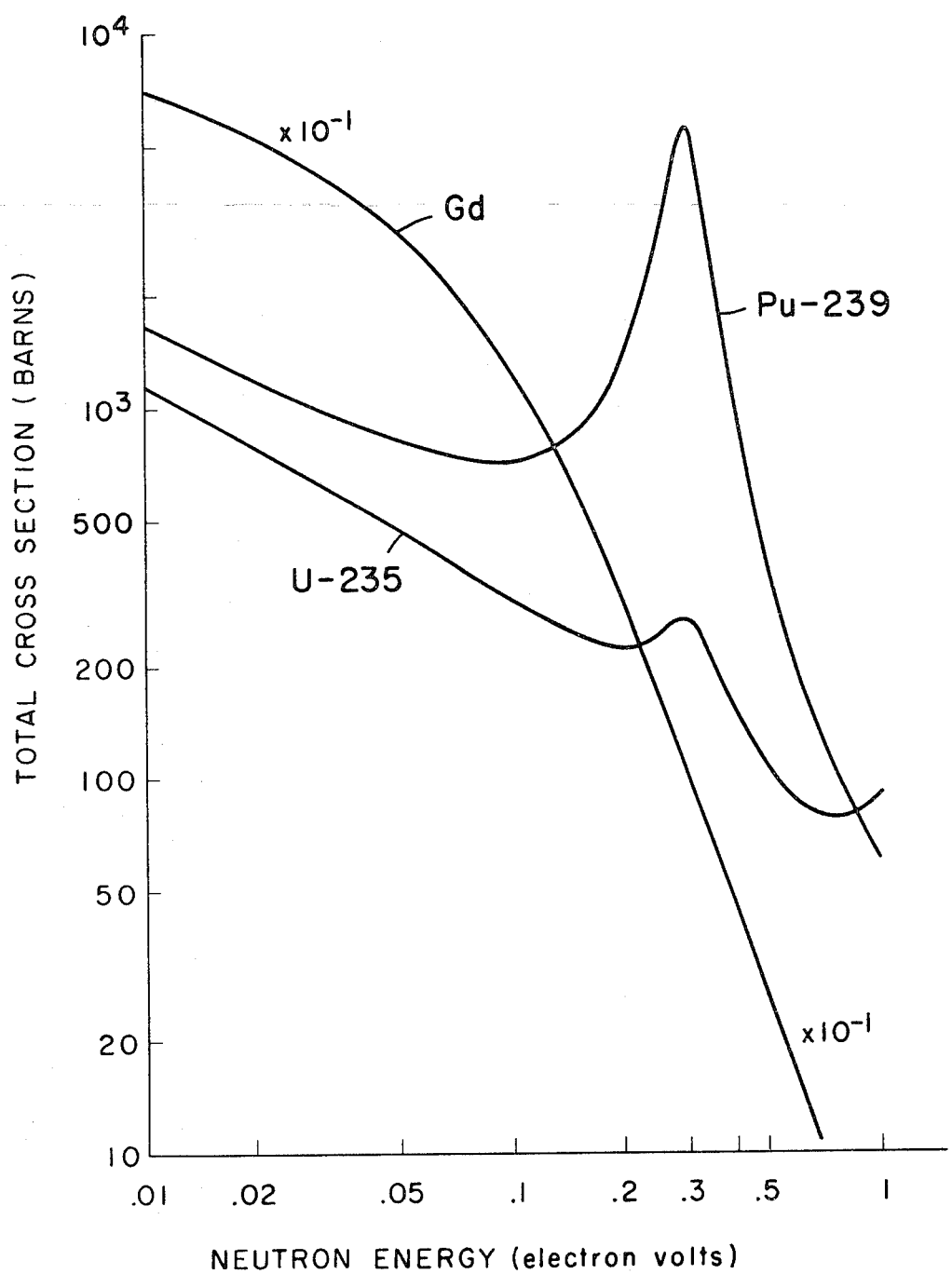
FIG. 15 illustrates the thermal energy dependent microscopic cross sections of uranium and plutonium fuel and the average microscopic cross section of gadolinium poison.

In accordance with a preferred embodiment of the invention these undesirable effects are alleviated by using plutonium fuel in conjunction with the burnable poison, such as those mentioned hereinbefore, the preferred burnable poison being gadolinium. The advantages of the plutonium-gadolinium combination result from the neutron energy dependence of the gadolinium and fissile plutonium cross sections in the thermal energy region below about 0.5 electron volt. The microscopic cross section of Pu-239, U-235, and Gd in the thermal energy range are shown in FIG. 15. It is seen that the cross section of gadolinium decreases rapidly above about 0.1 electron volt—much more rapidly than the usual $1/v$ energy dependence (where $v$ is the neutron velocity). However, the cross section of Pu-239, increases from about 0.1 electron volt to a peak at about 0.3 electron volt while, except for a minor peak at 0.3 electron volt, the cross section of U-235 displays the usual $1/v$ energy dependence. Also, the cross section of Pu-239 is greater than the cross section of U-235 for all but the highest thermal energies and it is considerably greater over the range of 0.1–0.5 electron volts. It is thus seen that the ratio of plutonium-to-gadolinium cross sections is greater than the ratio of uranium-to-gadolinium cross sections and the Pu-to-Gd cross section ratio increases much more rapidly than the U-to-Gd cross section ratio over the 0.1–0.3 electron volt energy range.

Because of the greater cross section of fissile plutonium relative to fissile uranium, the plutonium competes more favorably with the burnable poison for neutrons and provides a greater number of fissions. Thus a fissile plutonium-gadolinium mixture provides a higher power density than a comparable fissile uranium-gadolinium mixture. This helps to alleviate the aforementioned local power peaking effect.

The spectrum of neutron energies hardens (shifts toward higher energies) as the reactor core changes from the cold condition to the hot operating condition. However, as discussed above, the ratio of plutonium-to-gadolinium absorptions increases substantially as the neutron spectrum hardens. This provides a positive reactivity effect which at least partially compensates for the negative reactivity effect due to the aforementioned increased poison control with temperature.

With its larger cross section, plutonium depletes more rapidly than U-235. Thus the use of plutonium fuel with the burnable poisons helps to offset the tendency toward the aforementioned increase in power density in the poisoned fuel as the poison depletes with exposure.

The following table summarizes some of the thermal neutron performance factors of an example fuel bundle with two fuel rods containing gadolinium and plutonium as compared to a comparable fuel bundle with two fuel rods containing gadolinium and fissile uranium. In this table ($\eta f$) is the number of fission neutrons produced per thermal neutron absorbed.

TABLE I

| | Gd-Pu | Gd-U |
|---|---|---|
| Cold ($\eta f$) | 1.5121 | 1.5122 |
| Hot ($\eta f$) | 1.5204 | 1.5128 |
| Relative power, Poisoned rod/Average rod | 0.6241 | 0.1751 |
| Isotopic enrichments (atom percent): | | |
| Fissile Pu | 2.5 | |
| Fissile U | 0.7 | 2.5 |

To be noted is the greater positive change of the reactivity of the Gd-Pu rod from the cold to hot condition and its substantially greater relative power.

The gadolinium-plutonium combination may be used in the form of a gadolinium-plutonium mixture prepared in a manner similar to that described hereinbefore for the gadolinium-uranium mixtures. Natural or depleted uranium may be used with the gadolinium-plutonium mixture as a diluent or other suitable materials such as aluminia or zirconia may be used for this purpose. Performance characteristics intermediate of the Gd-Pu and Gd-U mixtures may be obtained by mixing both enriched uranium and plutonium with burnable poison in the same fuel rod. In any case, the amounts and distribution of the burnable poison may be determined in accordance with the principles set forth herein to achieve the amounts and distribution of the reactivity control and the poison depletion characteristics desired.

The relative amount of plutonium fuel used with the burnable poison depends upon the particular circumstances. In general, the plutonium content may be increased to the extent that the maximum local power density with exposure in the plutonium containing fuel approaches the maximum local power density in any other of the fuel rods of the assembly.

Plutonium-burnable poison combinations other than mixtures may be used with similar advantage. For example, the burnable poison may be in the form of discrete particles, lumps, wires or the like in predetermined segments of the fuel element with the plutonium contained in the fuel adjacent to the burnable poison in the segments.

In the above-described embodiments of the invention the burnable poison is formed in a cylindrical configuration to provide a linear decrease in control strength which matches the typical linear decrease in reactivity of the fuel in large power reactors. However, by appropriate choice of burnable poison configuration, or a combinatin of configurations, other shapes of reactivity loss curves can be substantially matched. For example, self-shielding burnable poison in a spherical configuration provides reactivity control which decreases more rapidly with exposure during the early part of the operating cycle than during the later part of the operating cycle. A relatively thin strip or slab of self-shielding burnable poison provides reactivity control which is substantially constant with exposure with a rapid drop in control worth as complete burnup of the poison is approached. Other possible configurations include hollow cylinders or tubes, rods of elliptical cross-section and flat-sided rods such as hexagonal rods. Combinations of various sizes of burnable poison particles can also be used in the provision of the appropriate exposure-dependent reactivity control.

Figure 16:
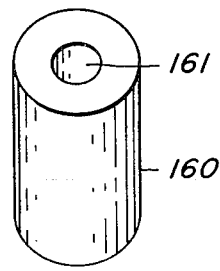
FIG. 16 illustrates a poisoned annular fuel pellet.
Figure 17:
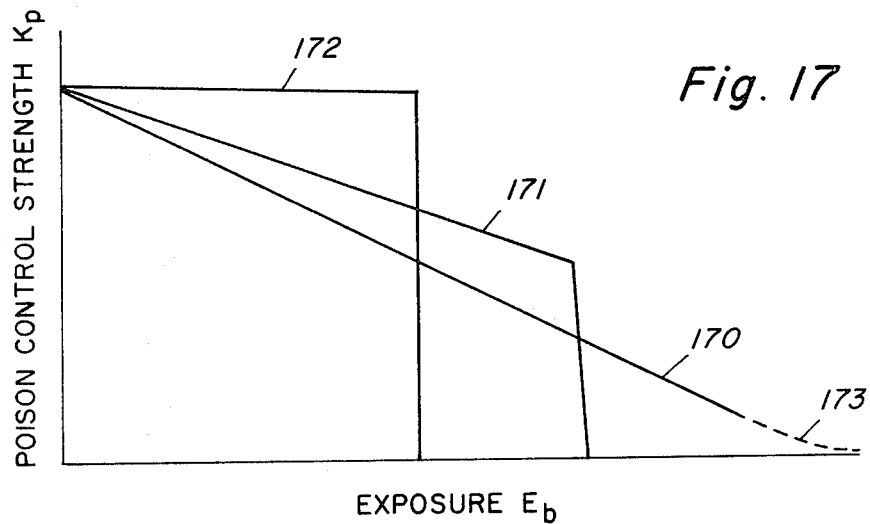
FIG. 17 illustrates the changes in reactivity control versus exposure for example poisoned annular pellets as compared to a poisoned solid cylindrical pellet.

A hollow cylindrical or annular poisoned pellet 160 as illustrated in FIG. 16 is particularly advantageous for utilization of poisoned plutonium fuel since the increased ratio of fissile to fertile material which is required for annular pellets can be tolerated with plutonium fuel without significant penalty. In addition, the reduced central temperature of the annular pellet allows higher power density in the poisoned fuel thereby permitting lower conductivity-lower density pellet designs and/or accommodating a local peak in the poisoned pellet without center melting at the time, for example, of poison depletion. Typical poison control strength $K_p$ versus exposure $E_b$ characteristic curves for annular pellets are compared to the characteristic curve of a solid pellet in FIG. 17. The three pellets are assumed to be of the same outside diameter and length and to contain the same number of burnable poison atoms of sufficient minimum density to be highly self-shielding.

Curve 170 illustrates the decrease in control strength with exposure characteristic of a poisoned solid pellet and it is similar to those shown in FIG. 7 as discussed hereinbefore. Toward the end of the life of the poison, as complete burnup of the poison is approached, the curve 170 departs from a straight line as indicated by the dashed portion 173.

Curve 171 illustrates the decrease in control strength with exposure of a poisoned annular pellet having about 25 percent central void volume. For the same number of poison atoms as in the solid pellet the slope of curve 171 is less than that of curve 170 because of the greater poison atom density and thereby slower reduction in effective poison radius with time. The outstanding characteristic of the poisoned annular pellet is its sharp drop in control strength as depletion of the poison is reached. This characteristic can be advantageously used to provide definite truncation of poison control and to reduce residual poison.

Curve 172 illustrates the change in control strength with exposure of a poisoned annular pellet having a very thin wall (that is, having a large central opening). The small slope of the curve results from the high poison density and from the nearly constant poison surface area. The sharp drop in control strength as complete burnup of the poison is approached is evident.

It is to be noted that the inner or inside surface 161 (FIG. 16) of the annular pellet does not contribute significantly to the effective surface area (the control strength) of the poison because this inside surface is shielded by the poison from exposure to neutrons. Thus as used herein the term "surface area of the poison" does not include the inner surface of annular pellets. Since the pellets illustrated by FIG. 17 have the same effective surface area the initial control strength is the same in each case based on the assumption that in each case the poison is completely black.

Some of the relationships (1)–(19) developed hereinbefore require modification to define the use of hollow cylindrical or annular poison members as follows:

Relationship (7): If $\rho$(atoms/cm.³) is the density of the burnable poison atoms, then the initial number of atoms per unit length of a hollow cylinder is given by (7A) $$h = \rho \pi (r_o^2 - r_i^2)$$

where $r_o$ is the initial outer radius of the hollow cylinder, and $r_i$ is the inner radius of the hollow cylinder.

Relationship (10): For the hollow cylinder the poison is completely consumed when the outer radius $r_o$ is reduced to the inner radius $r_i$, thus (10A) $$\overline{\phi} t_b' = 4\rho(r - r_i)$$

where $t_b'$ is the idealized time for complete burnup of the poison, and $\overline{\phi}$ is the average neutron flux during time $t_b'$.

Figure 18:
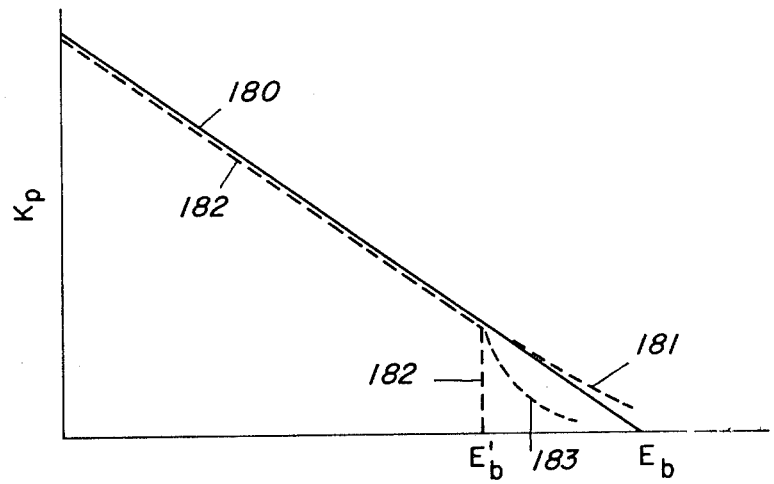
FIG. 18 compares the control strength with exposure of a hollow cylindrical poison member of relatively small inner radius to the control strength of a solid cylindrical poison member of the same outer radius.

FIG. 18 illustrates the behavior of burnable poison in hollow cylindrical configuration compared to a solid cylinder of the same outside diameter and length (same effective surface area). It is assumed that the poison density is the same for both hollow and solid cylinders, thus the number of poison atoms in the hollow cylinder is less by the volume of its central hole.

The solid line curve 180 illustrates the idealized decrease in control strength with exposure of the poisoned solid cylinder. Thus ideally the poison is completely depleted at the exposure $E_b$ at the end of the fuel cycle. However, toward the end of the cycle, as the poison nears complete burnup, the poison burnup tends to "tail-off" in an exponential fashion as illustrated by the dashed curve 181.

The dashed curve 182 of FIG. 18 illustrates the idealized decrease in control strength with exposure of the poisoned hollow cylinder (of the same surface area and poison density). Thus ideally the poison in the hollow cylinder is completely depleted at an exposure $E_b'$ somewhat before the end of the fuel cycle. However, in practice, burnup of the poison of the hollow cylinder also tends to tail off in an exponential fashion as complete poison burnup is approached as illustrated by the dashed curve 183. Thus the control strength of the hollow poisoned cylinder maintains reasonably good match with the desired straight-line control strength with less likelihood of residual poison at the end of the fuel cycle.

As a specific application of poisoned hollow cylinders consider the same example set forth hereinbefore for the determination of the poison density and number of poison cylinders in zone (3a, 1r) (FIGS. 11A and 11B).

As a specific application of poisoned hollow cylinders consider the same example set forth hereinbefore for the determination of the poison density and number of poison cylinders in zone (3a, 1r) (FIGS. 11A and 11B).

The poison density is given by relationship (10A) which may be rewritten as $$\rho = \frac{\overline{\phi} t_b}{4(r_o - r_i)}$$

However, the idealized time of poison burnup $t_b$ for the hollow pellet (as illustrated in FIG. 18) is related to the fuel cycle time $t_f$ by $$\frac{t_b}{t_f} = \frac{r_o - r_i}{r_o}$$

or $$\frac{t_b}{r_o - r_i} = \frac{t_f}{r_o}$$

Taking account of the tail 183 (FIG. 18) in the actual control strength of the poisoned hollow cylinder, the poison burnup time $t_b'$ is less than the cycle time $t_f$ as indicated above. Thus the required density of the poison in the hollow cylinder is given by $$\rho = \frac{\overline{\phi} t_f}{4 r_o}$$

Thus for the same neutron flux $\overline{\phi}$ and the same outer radius $r_o$ the density of the poison in the hollow cylinder is the same as that in the previous example of the solid cylinder (since in the case of the solid cylinder it was assumed that the poison burnup time $t_b$ is equal to the cycle time $t_f$).

However, for the same size and poison density the hollow cylinder contains fewer poison atoms and the time $t_b'$ (FIG. 18) will be reached in a fraction of the fuel cycle given by $$\frac{r_o - r_1}{r_o}$$

For example if the hollow cylinder has an outer diameter $r_o$ of 0.635 cm. and an inner radius $r_1$ of 0.127 cm. the time $t_b'$ is reached at $$\frac{0.635 - 0.127}{0.635}$$

or about 0.8 of the fuel cycle. This provides about 20 percent of the fuel cycle for the tail of control strength 183 (FIG. 18) and reduces the likelihood of residual poison at the end of the fuel cycle at time $t_f$.

The number of poison cylinders (hollow or solid) is determined by the relationship (19), where $r_o$ is the outer radius of the cylinder. The number of poison cylinders is the same for both hollow and solid cylinders since the inner radius does not enter this relationship (because, as pointed out above, the inner surface of the hollow cylinder does not contribute significantly to the control strength).

Thus hollow poisoned cylinders of the same poison density and with the same number of cylinders in each zone can replace the solid cylinders of the example illustrated in FIGS. 11A–14 if the inner radius of the hollow cylinder is not too large. For a hollow poisoned cylinder of given dimensions a greater poison density can be used to extend the poison burnup time as shown by relationship (10A).

Thus what has been described is a burnable poison structure for use in a nuclear reactor core to control the excess reactivity and to maintain a stationary power distribution during the operating cycle of the core and wherein plutonium fuel may be used in conjunction with the burnable poison to improve local power distribution and control margin and as an effective means for utilizing plutonium fuel.

What is claimed is:

1. A replaceable fuel assembly for use with other fuel assemblies in a nuclear reactor core to provide given exposure over a given fuel cycle, said fuel assembly comprising a plurality of at least three spaced elongated elements containing nuclear fuel, said nuclear fuel including an initial first fissile fuel comprising plutonium and an initial second fissile fuel comprising uranium, self-shielded burnable poison mixed with said first initial fuel in at least one of said fuel elements of said assembly, the fuel in the other fuel elements of said assembly initially containing said second fissible fuel free of plutonium.

2. The fuel assembly of claim 1 wherein said burnable poison is gadolinium.

3. The fuel assembly of claim 1 wherein the fuel containing said burnable poison is formed with a central portion substantially devoid of said burnable poison.

4. The fuel assembly of claim 1 wherein the amount of said first fissile fuel contained in said one of said fuel elements is selected to provide a maximum power density in said one of said fuel elements during said fuel cycle substantially equal to the maximum power density in any other of said fuel elements during said fuel cycle.

5. The fuel assembly of claim 1 wherein said burnable poison has a thermal neutron capture cross section which decreases more rapidly than $1/v$ with increases in thermal neutron energy.

6. A replaceable fuel assembly for use with other fuel assemblies in a nuclear reactor core, said fuel assembly comprising a plurality of at least three fuel elements containing nuclear fuel to provide an initial excess of reactivity to achieve a given exposure over a given fuel cycle, said nuclear fuel including an initial first fissile fuel comprising plutonium and an initial second fissible fuel comprising plutonium, at least one of said elements containing self-shielded burnable poison in a plurality of axial zones along said one of said elements to control said excess reactivity, said burnable poison being mixed with the said first fissile fuel in said axial zones of said one of said elements, the fuel in all other fuel elements of said fuel assembly initially containing said second fissile fuel free of plutonium.

7. The fuel assembly of claim 6 wherein said burnable poison has a thermal neutron capture cross section which decreases more rapidly than $1/v$ with increases in thermal neutron energy.

8. The fuel assembly of claim 6 wherein said burnable poison is gadolinium.

References Cited

UNITED STATES PATENTS

| | | | |
|---|---|---|---|
| 3,042,598 | 7/1962 | Crowther | 176—78 X |
| 2,992,179 | 7/1961 | Bassett | 176—78 X |
| 2,984,613 | 5/1961 | Bassett | 176—78 X |
| 3,147,191 | 9/1964 | Crowther | 176—78 X |
| 3,104,219 | 9/1963 | Sulzer | 176—83 X |
| 3,334,019 | 8/1967 | Bogaadt et el. | 176—40 |
| 3,427,222 | 2/1969 | Biancheria et al. | 176—68 |
| 3,122,484 | 2/1964 | Iskenderian | 176—18 |
| 3,287,227 | 11/1966 | Ackroyd et al. | 176—40 |
| 3,341,420 | 9/1967 | Sery | 176—18 |

REUBEN EPSTEIN, Primary Examiner

U.S. Cl. X.R.

176—66, 73

UNITED STATES PATENT OFFICE
CERTIFICATE OF CORRECTION

Patent No. 3,799,839                 Dated 26 March 1974

Inventor(s) D. L. Fischer/F. R. Channon

It is certified that error appears in the above-identified patent and that said Letters Patent are hereby corrected as shown below:

Column 2, line 41, 42 and 43, "Proceedings of the Second United Nations International Conference on the Peaceful Uses of Atomic Energy" should be --underlined--. Column 3, line 24, "if" should be --of--. Column 4, line 3, "of" should be --or--. Column 4, line 38, "cycles" should be --cycle--. Column 6, lines 45-46, "The Naval Reactor Physics Handbook" should be --underlined --. Column 7, line 50, "(a)" should be --(b)--. Column 9, line 55, "complete" should be --compete--; Column 9, line 74, "radium" should be --radius--. Column 11, line 30, "selfshielding" should be --self-shielding--. Column 13, line 67, omit the second occurrence of "view"; Column 13, line 67-68, "type assemblies illustraing" should be --type H assemblies illustrating--. Column 13, line 71, "two-containing" should be --two poison-containing--. Column 14, line 2, "FIG." should be --FIGS.--. Column 14, line 23, "$t_b$" should be --$t_b = t_f$--. Column 14, line 33, "$p_0$" should be --$p_n$--. Column 14, line 48, after "of" insert --the--. Table I "Cold ($n_J$)" should be --Cold (nf)--. Column 17, line 75, "$=4p(r - r_i)$" should be --$4p(r_o - r_i)$--. Column 18, delete lines 37-40. Column 19, line 51, Claim 1., "fissible" should be -- fissile--. Column    , line 20-21, Claim 6., "second fissible fuel comprising plutonium" should be -- second fissile fuel of lower fission cross section.

Signed and sealed this 10th day of June 1975.

(SEAL)
Attest:

RUTH C. MASON
Attesting Officer

C. MARSHALL DANN
Commissioner of Patents
and Trademarks